United States Patent
Seino et al.

(10) Patent No.: US 8,927,939 B2
(45) Date of Patent: Jan. 6, 2015

(54) RADIATION MEASUREMENT APPARATUS AND NUCLEAR MEDICINE DIAGNOSIS APPARATUS

(75) Inventors: Tomoyuki Seino, Hitachi (JP); Yuichiro Ueno, Hitachi (JP); Takafumi Ishitsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/580,556

(22) PCT Filed: Feb. 3, 2011

(86) PCT No.: PCT/JP2011/052253
§ 371 (c)(1),
(2), (4) Date: Aug. 22, 2012

(87) PCT Pub. No.: WO2011/111447
PCT Pub. Date: Aug. 15, 2011

(65) Prior Publication Data
US 2012/0326045 A1   Dec. 27, 2012

(30) Foreign Application Priority Data
Mar. 11, 2010   (JP) .................... 2010-053947

(51) Int. Cl.
*G01T 1/24* (2006.01)
(52) U.S. Cl.
CPC ...................... *G01T 1/247* (2013.01)
USPC .................................. 250/370.07
(58) Field of Classification Search
USPC ............. 250/370.07, 370.13, 370.12, 370.01
See application file for complete search history.

(56) References Cited

U.S. PATENT DOCUMENTS

| 3,818,356 A * | 6/1974 | Kinbara .................. 327/13 |
| 6,097,032 A | 8/2000 | Tanimori et al. |
| 6,118,849 A | 9/2000 | Tanimori et al. |
| 2002/0175291 A1 * | 11/2002 | Reeder et al. .............. 250/369 |

(Continued)

FOREIGN PATENT DOCUMENTS

| JP | 57-149979 A | 9/1982 |
| JP | 11-072569 A | 3/1999 |
| JP | 3622967 B1 | 2/2005 |
| JP | 2006-071463 A | 3/2006 |

OTHER PUBLICATIONS

Luke; "Unipolar Charge Sensing with Coplanar Electrodes-Application to Semiconductor Detectors"; IEEE Transactions on Nuclear Science, Aug. 1995; pp. 207-213; vol. 42; No. 4.
Auricchino et al.; "Compensation of CdZnTe Signals Using a Twin Shaping Filter Technique", IEEE Transactions on Nuclear Science, 2004; pp. 2485-2491; vol. 51; No. 5.

(Continued)

*Primary Examiner* — David Porta
*Assistant Examiner* — Djura Malevic
(74) *Attorney, Agent, or Firm* — Mattingly & Malur, PC

(57) ABSTRACT

The purpose of the present invention is to improve energy resolving power and prevent energy resolving power from deteriorating when a thick semiconductor detection element with a wide energy range is used, in a radiation measuring device using a semiconductor detector and a nuclear medicine diagnostic device. With the present invention, the purpose is achieved by pulsed wave value correction employing the difference of (Hs−Hf) between the pulsed wave height value Hs obtained from the slow speed shaping circuit, and the pulsed wave height value Hf obtained from the fast speed shaping circuit and normalized with respect to Hs. An even more desirable result may be obtained by employing either (Hs−Hf)/Hf or exp(k(Hs−Hf)/Hf), wherein k is a coefficient to be optimized, said optimization being dependent on the measurement assembly.

15 Claims, 8 Drawing Sheets

(56) References Cited

U.S. PATENT DOCUMENTS

| | | | |
|---|---|---|---|
| 2003/0033097 A1* | 2/2003 | Tanaka et al. | 702/60 |
| 2003/0105397 A1* | 6/2003 | Tumer et al. | 600/436 |
| 2004/0239377 A1* | 12/2004 | Tumer et al. | 327/94 |
| 2006/0015290 A1* | 1/2006 | Warburton et al. | 702/178 |
| 2006/0043309 A1* | 3/2006 | Yokoi et al. | 250/370.08 |
| 2007/0007463 A1* | 1/2007 | DeGeronimo | 250/382 |

OTHER PUBLICATIONS

Auricchino et al.; "Twin Shaping Filter Techniques to Compensate the Signals From CZT/CdTe Detectors", IEEE Transactions on Nuclear Science, Oct. 2005; pp. 1982-1988; vol. 52; No. 5.

Horovitz; "Correction of incomplete charge collection in CdTe detectors", Nuclear Instruments and Methods in Physics Research, Section A, 1994; pp. 60-66; vol. 353.

* cited by examiner

RADIATION MEASUREMENT APPARATUS AND NUCLEAR MEDICINE DIAGNOSIS APPARATUS

TECHNICAL FIELD

The present invention is related to a radiation measurement apparatus and a nuclear medicine diagnosis apparatus both of which utilizes a semiconductor element as a detection element.

BACKGROUND ART

The semiconductor detector used for a radiation detector has a higher energy resolution on an X-ray and a gamma ray than the scintillation detector, which is an excellent feature for the semiconductor detector. As a result, semiconductor radiation detectors of Silicon or Germanium are often used to accurately measure energies of X-rays and gamma rays. However, since Silicon has an atomic number of 14 which is relatively small and a density about as small as 2.3 g/cm$^3$, Silicon is not capable of absorbing high energy X-rays and gamma rays efficiently. Moreover, although Germanium has an atomic number of 32 that is larger than that of Silicon and a density of 5.4 g/cm$^3$ that is larger than that of Silicon, Germanium has a band gap as small as 0.7 eV and should be used while kept cooled at a temperature as low as that of liquid nitrogen.

On the other hand, semiconductor detectors, which are capable of absorbing high energy X-rays and gamma rays efficiently and used at room temperatures, have been developed and are cadmium telluride (CdTe) and cadmium zinc telluride (CdZnTe) which are typical among them. For instance, CdTe having an atomic number of 50 and a density of 5.8 g/cm$^3$ is capable of absorbing high energy X-rays and gamma rays more efficiently than Germanium and is used at room temperatures because of having a larger band gap of 1.4 eV. However, such compound semiconductor materials as CdTe and CdZnTe have the following problem. That is, mobilities of an electron and a hole in a carrier crystal of any of CdTe and CdZnTe is smaller than those in Si or Ge. When an semiconductor element is used for a radiation detector, carriers are generated according to a photoelectric effect on gamma ray coming incident into the semiconductor element. These carriers are measured by measuring an electrical current of the carriers flowing through an external circuit. Therefore a product of the mobility μ and its duration of life τ is used for a criterion to determine whether a semiconductor detector is sufficiently good.

In general, the larger the product of μ and τ, the higher the energy resolution becomes. If the product of μ and τ is small, the energy resolution becomes low. Since CdTe and CdZnTe have smaller products of μ and τ than that of Si or Ge, the energy resolution is lower for CdTe and CdZnTe than for Si and Ge. Therefore CdTe and CdZnTe are not suited for measuring accurately energies of X-rays or gamma rays. However, for example, if the semiconductor detector of CdTe and CdZnTe is utilized instead of the scintillation detector for a gamma camera, a nuclear medicine diagnosis apparatus such as single photon emission computed tomography (SPECT) and a radioactive substance detection apparatus used outdoors, for each of which the scintillation detector has been used so far, each of the apparatuses could have a higher energy resolution and an improved function.

Such materials as CdTe or CdZnTe have smaller products of μ and τ than that of Si or Ge, as already explained. Especially the products of μ and τ of the holes of CdTe and CdZnTe are smaller, which is a problem. The product of μ and τ of the hole of CdZnTe is smaller than CdTe. To overcome the problem of the smaller product of μ and τ of the hole, an improved electrode construction and an improved circuit with a modified read-out circuit, which is disclosed by the non-patent document 1, are used. Although this method is excellent because signals are read only through electrons, it is necessary to divide an anode into small electrodes and make a distance between the small electrodes of the anode and a cathode and an anode larger in order to have hole induced charges having a less effect on the electrodes. Therefore this method is suited for a relatively large crystal and properties of the crystal need to be uniform in the entire crystal. On the other hand, it is difficult to produce a large crystal in which properties are uniform.

Since the product of μ and τ of the hole of CdTe is not so small as that of CdZnTe, CdTe is used usually with planar plate type electrodes (Planar type) which is much simpler than the complicated electrodes for CdZnTe. However, when the distance between the electrodes, which corresponds to a thickness of the element, becomes large, the energy resolution becomes lower due to the effect from the small product of μ and τ of the hole. Accordingly relatively thin elements of CdTe having thickness of 0.5 to 1.0 mm are usually used.

The method disclosed in the patent document 1 makes use of a couple of waveform shaping circuits whose time constants are different from each other. This method performs a correction assuming the product of μ and τ of the hole being small, and the energy resolution is expected to be high. A specific correction method, which is disclosed in the non-patent document 2 and the non-patent document 3, makes use of Vf/Vs where Vf is an output from the fast speed waveform shaping circuit and Vs is an output from the slow speed waveform shaping circuit. The non-patent document 4 discloses a basic principle of a correction method called a biparametric correction, which makes use of a difference between an increase in the induced charges with the electron and an increase in the induced charges with the hole.

PRIOR ART LITERATURE

Patent Document 1: Patent Gazette No. 3622967
Non-Patent Document 1: P. N. Luke, "Unipolar Charge Sensing with Coplanar Electrodes-Application to Semiconductor Detectors", IEEE Transactions on Nuclear Science, Vol. 42 No. 4, August 1995, pp. 207-213.
Non-Patent Document 2: N. Auricchino, A. Basili, E. Caroli, A. Donati, T. Franceschini, F. Frontera, M. Hage-Ali, G. Landini, A. Roggio, F. Schiavone, J. B. Stephen, and G. Ventura, "Compensation of CdZnTe Signals Using a Twin Shaping Filter Technique", IEEE Transactions on Nuclear Science, Vol. 51(5), 2004, pp. 2485-2491.
Non-Patent Document 3: N. Auricchino, L. Amati, A. Basili, E. Caroli, A. Donati, T. Franceschini, F. Frontera, G. Landini, A. Roggio, F. Schiavone, J. B. Stephen, and G. Ventura, "Twin Shaping Filter Techniques to Compensate the Signals From CZT/CdTe Detectors", IEEE Transactions on Nuclear Science, Vol. 52, No. 5, October 2005, pp. 1982-1988.
Non-Patent Document 4: Y. Eisen, Y. Horovitz, "Correction of incomplete charge collection in CdTe detectors", Nuclear Instruments and Methods in Physics Research, Section A, Vol. 353, 1994, pp. 60-66.

SUMMARY OF INVENTION

Objective of the Present Invention

Since CdTe has a lager product of μ and τ of the hole than that of CdZnTe, CdTe is used usually with the planar type electrodes. However, the used CdTe is no thicker than 0.5 to 1.0 mm and if CdTe so thick as this is used for the SPECT apparatus, it was necessary to put a large number of the elements of CdTe on a plane. If small sized elements of CdTe are used to obtain a high resolution that is required, there are problems with a high cost for the large number of the elements of CM and with a larger area in which no signal is sensed. If a thicker element is used, the energy resolution becomes lower while the number of the elements is made smaller. Therefore it has been difficult to increase the thickness of the element of CdTe beyond a certain thickness.

To solve this problem, there is a way to increase the applied voltage to a thicker element to increase the mobilities of carriers of the thicker element. If this way is used, it is necessary to apply to the thicker element twice as thick as a thinner element a voltage which is higher than that applied to the thinner element by times of a squared ratio of the thickness of the thicker element to the thickness of the thinner element, in order to make the mobilities of carriers of the thicker one as large as those of the thinner one. For example, in order to obtain as large mobilities of a 2 mm thick element as those of a 1 mm thick element to which 500 V is applied, a voltage of 2000 V, which is four times higher than applied to the 1 mm thick element, has to be applied to the 2 mm thick element. Applying such a high voltage is a disadvantage for reliability of the element and not practically possible. Therefore it has been required to develop a method in which the energy resolution is made higher without applying a high voltage that is too high to be applied. The correction method as described in the non-patent document 2 and 3 has an effect and a correction method to have a larger effect has been desired.

Measures to Achieve the Objective

The present invention is intended to provide a radiation measurement apparatus comprising, a radiation detector of a semiconductor crystal for detecting a gamma ray, a power supply for applying a bias voltage to the radiation detector, a pre-amplification circuit for amplifying a pulse signal from the radiation detector, a couple of waveform shaping circuits having time constants different from each other, each of the couple of waveform shaping circuits configured to have a function to shape a waveform of an output signal from the pre-amplification circuit, wherein the radiation measurement apparatus obtains an energy value of the gamma ray by performing a computing processing on output signals from the couple of waveform shaping circuits using a difference between a couple of pulse height values of the output signals from the couple of waveform shaping circuits.

Effect of the Invention

The present invention has an effect of obtaining a relatively high energy resolution without increasing an applied voltage applied to the thicker element by the times to the squared ratio of the thickness of the thicker element to the thickness of the thinner element, if the thick element is used. The obtained effect of the present invention is larger than when using Vf/Vs.

EMBODIMENT FOR PRACTICING THE INVENTION

Figure 1:
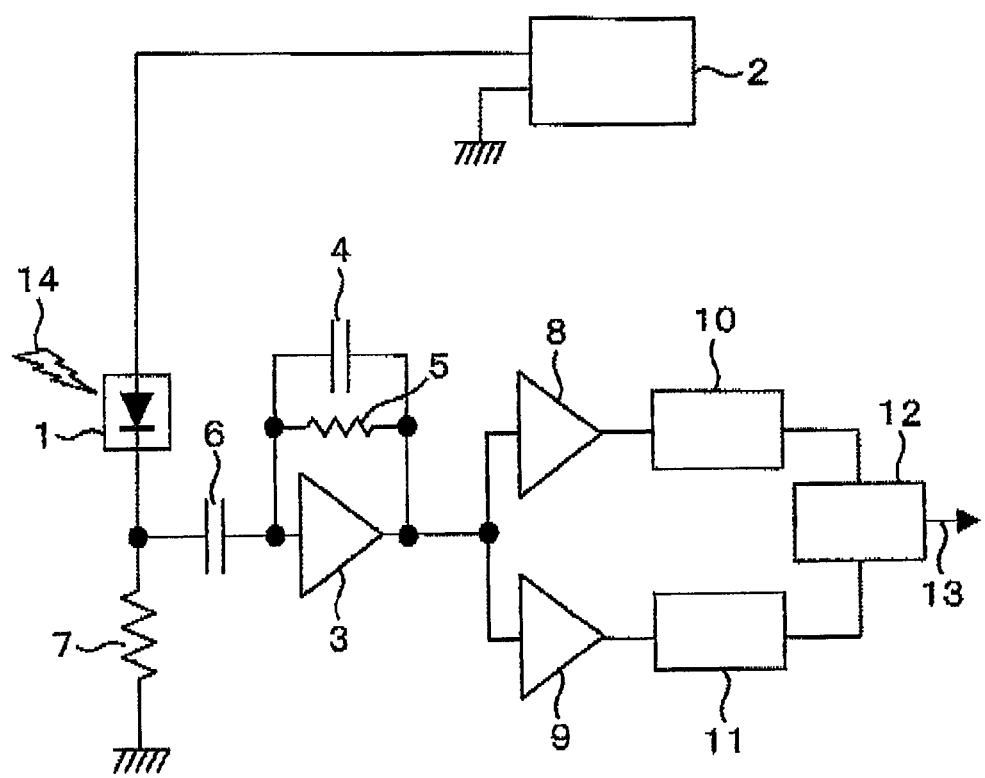
FIG. 1 is a schematically represented circuit used for a radiation measurement apparatus to which the present invention is applied.

Hereinafter are explained working examples of a radiation measurement apparatus and a nuclear medicine diagnosis apparatus of the present invention.

DESCRIPTION OF REFERENCE NUMBER

There are several radiation detectors used for a radiation measurement apparatus, such as an ionization chamber, a scintillation detector, a semiconductor detector and an integrating dosimeter. Depending on an application, a suitable detector among them is used. When energy information on X-rays and gamma rays as well as a close of X-rays and gamma rays is needed, the semiconductor detector is usually used. The reason is that X-rays and gamma rays coming incident into the semiconductor detector generates through energy conversion a lot of carrier charges of electrons and holes, which is in proportion to the energy of the X-ray or the gamma ray. That is, measuring the amount of carrier charges generated enables accurately measuring the energies of the X-ray and the gamma ray. Similarly the energies of the X-ray and the gamma ray are measured with the scintillation detector, which converts the X-rays and the gamma rays to a lot of photons. An amount of the converted photons are measured through a photomultiplier tube or a photodiode and the energies of the X-ray and the gamma ray are measured. In this case, since the energy of the X-ray or the gamma ray is once converted to the photons, it is difficult to accurately measure the energy information. As a result, the semiconductor detectors are exclusively used.

Such materials as Si, Ge, CdTe and CdZnTe have been known to be used for the semiconductor detector. Si is a most well-known material which is used for IC as well. Since Si has an atomic number of 14 that is relatively small and a relatively low density, a probability of X-rays or gamma rays reacting in a Si crystal is low and Si is mainly used for an element analysis apparatus in which relatively low energy X-rays are used.

Ge has an atomic number of 32 that is larger and a relatively high mobility of carriers, which contributes to a high energy resolution of the Ge radiation detector. However, since Ge has so small a band gap as 0.7 eV, which makes a leakage current of the Ge radiation detector is rather large, the Ge detector has to be kept cooled at a low temperature when it is used. Both CdTe and CdZnTe have band gaps which are between 1.4 and 1.6 eV and are suited for the radiation detector because their leakage currents at room temperatures are relatively small. In addition, since an average atomic number of each of CM and CdZnTe is around 50, CdTe and CdZnTe have relatively high sensitivities to X-rays and gamma rays. Since CdZnTe consists of three elements, it is difficult to produce a homogeneous CdZnTe crystal with a high yield. On the other hand, CdTe consists of two elements and a crystal of CdTe is produced with a high yield and successfully mass produced recently.

As is explained, the radiation detector of CdTe is capable of being used at room temperatures and has a high sensitivity to X-rays and gamma rays. A diode is made of this material and used with a reverse bias voltage being applied thereto. However, since a compound semiconductor such as CdTe has often a small hole mobility and a small duration of life, a product of $\mu$ and $\tau$ of the hole which is used as a criterion for the performance of the radiation detector is small for the compound semiconductor radiation detector. To be specific, while the products of $\mu$ and $\tau$ of the holes of Si and Ge are respectively 33 and 40 (unit: cm$^2$/V), the products of $\mu$ and $\tau$ of the holes are respectively around $1\times10^{-4}$ and around $1\times10^{-5}$ which are much smaller. Therefore, in the case of CdTe and CdZnTe, holes could be gone before coming over to an electrode if they are generated at a position in a crystal far from the electrode.

As a result, the amount of the charges that are generated in the crystal and come over to an electrode to be measured varies depending on the position in the thickness direction of the crystal where a photoelectric effect induced by gamma rays occurs. Since the gamma ray energy is obtained according to the amount of the charges measured on semiconductor detector, the variation of the measured charges leads to a variation of the gamma ray energies to be measured, which results in the energy resolution deteriorating. Therefore, looking at an energy spectrum graph with the horizontal axis indicating the amount of charges, that is, the pulse wave height corresponding to the gamma ray energy and the vertical axis indicating the energy spectrum that is measured, in the spectrum graph are seen an main peak corresponding to the gamma ray energy, from which a tale portion extends toward the lower energy. This tale portion is generated largely due to the product of $\mu$ and $\tau$ of the hole being small and becomes a factor to lower the energy resolution. The narrower, the higher and the sharper the peak corresponding to the gamma ray energy in the energy spectrum graph, the higher the energy resolution is. Accordingly, the energy resolution is evaluated by a half peak width at half a peak height divided by a gamma ray energy for a horizontal axis position.

As is explained, the radiation detector of a compound semiconductor has a problem with the small product of $\mu$ and $\tau$ of the hole. Countermeasures to overcome this problem have been proposed. For example, it is known that there is a method for CdZnTe in which use is made almost exclusively of the charge signal of electrons while a contribution of the charge signal of holes is kept small. In this method as disclosed in the non-patent document 1, an anode is divided in small electrodes. Holes are attracted toward and collected at a cathode, coming far away from the anode. Since the anode is divided into the small electrodes, hole induced charges are distributed to the small electrodes and each of the small electrodes of the anode has a relative small amount of the hole induced charges. On the other hand, electrons coming close to the anode become a large amount of attracted charges, that is, signal charges. Thus the anode on CdZnTe is often used being divided in small electrodes. This method requires that the anode be divided in the small electrodes and that a distance between the anode and the cathode be made larger. As a result, a relatively large crystal that is homogeneous is needed and difficult to produce with a high yield.

CdTe has a product of $\mu$ and $\tau$ of the holes that is ten-fold as large as that of CdZnTe. Therefore, although the same method as is used for the CdZnTe element is rarely used, the CdTe element usually has a pair of simple undivided planar opposite electrodes or both electrodes divided not to avoid the influence of holes but to have divided pixel electrodes. In the case of the CdTe element, the thickness of the element is usually not thicker than about 1 mm because the CdTe element is strongly affected by the low hole mobility of CdTe. That is, wherever holes are generated in a CdTe crystal, almost all of these holes are able to come over to the cathode if the CdTe element is no thicker than 1 mm. However, not all of these holes are collected and there remains a small tale portion toward the lower energy.

If a CdTe element is as thick as about 2 mm which is double the thickness of the common CdTe element 1 mm thick, fourfold so high a voltage as is applied to the common CdTe element has to be applied to the 2 mm thick CdTe element in order to obtain the same collection rate of holes for the 2 mm thick CdTe element as for the 1 mm thick CdTe element. For instance, if a voltage of 500V is sufficiently high to be e applied to the 1 mm thick element, a voltage of 2000V needs to be applied to the 2 mm thick CdTe element and is too high to be applied. reliably in reality. Another countermeasure proposed to overcome the problem with the small product of $\mu$ and $\tau$ of the hole is a correction method called biometric correction. The basic principle of this correction method is described in the non-patent document 4 and makes use of a difference in the charge signal rising between the electron induced charge and the hole induced charge. Since the product of $\mu$ and $\tau$ of the electron is more than ten-fold larger than the product of $\mu$ and $\tau$ of the hole, different types of charge signals, whose rising speed are different from each other and which are derived from these the electron induced charge and the hole induced charge and superimposed on each other, are observed at the electrodes. Therefore, a position in the thickness direction of a crystal where a photoelectric effect occurs on gamma rays coming incident into a crystal is determined by measuring the charge signal rising and making a correction on an amount of charges for each position in the thickness direction is enabled.

Though rather complicated dedicated circuits are needed to directly measure charge signals rising, the non-patent document 2 discloses a method to use without using such dedicated circuits a couple of waveform shaping circuits whose time constants are different from each other and which have been used. Of these waveform shaping circuits, a faster time constant waveform shaping circuit is dedicated to obtain charge signals which electrons make principal contribution to forming and the slower time constant waveform shaping circuit is dedicated to both electrons and holes make contribution to forming.

In this measurement, a problem is how to determine values that are close to actual energy values of gamma rays from two types of the obtained charge signals. The non-patent document 2 discloses a method to make a correction using Vf/Vs where Vf denotes an output from the fast speed waveform shaping circuit and Vs denotes an output from the slow speed waveform shaping circuit. Unfortunately the correction accuracy of this correction method has not been indicated and it has not been proven right whether this correction method holds for a wide energy range. Therefore a correction method that is more accurate and capable of being applied to a wider energy range has been needed.

This objective is achieved by using Hs which denotes an output on a slow speed waveform shaping circuit through which an inputted pulse signal is treated and Hf obtained by normalizing with Hs an output on a fast speed waveform shaping circuit through which the inputted pulse signal and a difference of (Hs−Hf). Moreover a larger effect is obtained by using (Hs−Hf)/Hf which is (Hs−Hf) divided by Hf for correction. Furthermore, using for correction exp (k(Hs−Hf)/Hf) obtained by applying an exponent function to (Hs−Hf)/Hf, a larger effect is obtained. In this correction, k is a coefficient to adjust correction intensity. Both Hf and Hs are values which are obtained after an effect from such an error as attributed to off-set is removed. This error is variable depending on the system to be used.

The embodiment of the present invention enables accurate correction on energy values with the correction being right for a wide energy range. This embodiment is capable of making smaller a tale portion that is measured on a relatively thin element and remains in the low energy part and enabling higher energy resolution.

The effect obtained from the embodiment explained above is suited for not only radiation measurement apparatuses that have a high performance but also nuclear medicine diagnosis apparatuses which sell at relatively low prices. For instance, the SPECT apparatus requires a pixel type detector having a large detection area which is efficiently produced of a CdTe element that is approximately as thick as 2 mm. That is, when the detector is made about 1 mm thick, the position resolution necessarily becomes about 1 mm, which results in a position resolution being more than required and the production cost becoming higher due to a number of the elements being needed. If CdTe that is 2 mm thick is used, the number of the elements needed is equal to or less half the number for CdTe that is 1 mm thick, which leads to the production cost being highly reduced. Therefore the present invention is suited for the SPECT apparatus and has an excellent effect of enabling diagnosis on the SPECT apparatus for a lower cost.

Hereinafter, each example of the present invention is to be explained with reference to the attached figures. It should be noted that an explanation is skipped on an element in a figure to which the same number as attached to another element in a different figure.

In the example 1, use for correction of the difference of (Hs−Hf) is to be explained, where an output of a slow speed waveform shaping circuit is Hf and an output of a fast speed waveform shaping circuit is Hs. In the example 2, use for correction of (Hs−Hf)Hs/Hf, which is (Hs−Hf) multiplied by Hs and subsequently divided by Hf, is to be explained. In addition, it is to be explained in the example 3 that use for correction of (Hs−Hf)/Hf, which is (Hs−Hf) divided by Hf, has a larger effect. In the example 4, it is further explained that use for correction of exp (k(Hs−Hf)/Hf), which is (Hs−Hf)/Hf to which an exponential function is applied, has a larger effect as well. In this case, k is a coefficient to adjust correction intensity. Both Hf and Hs are values which are obtained after an effect from such an error as attributed to off-set is removed. This error is variable depending on the system to be used.

Example 1

Next, an example of the present invention for the radiation measurement apparatus is explained in detail.

In FIG. 1 are shown a radiation detector and a circuit up to a computing unit, on which the present example is based. The circuit of the radiation measurement apparatus in FIG. 1 includes a detector 1 inclusive of a semiconductor element with a semiconductor element to detect radiation, a high voltage power supply 2 to apply a high voltage, an amplification circuit 3, a fast speed waveform shaping circuit 8, a slow speed waveform shaping circuit 9, an A/D converter 10, an A/D converter 11 and a computing unit 12. The detector 1 made of a CdTe semiconductor is equivalent to a diode and used with a reversely biasing voltage being applied to the detector 1. Since the output voltage of the high voltage power supply 2 is negative, the detector 1 is appropriately connected as a diode in FIG. 1.

To begin with, the operation of the circuit when radiation is being measured is explained. A negatively biasing DC voltage from the high voltage power supply 2 is applied to the detector 1, which is a semiconductor radiation detector and corresponds to a diode that is reversely biased. Accordingly a depletion layer is formed in the detector 1 and only a very small leakage current is flowing unless a gamma ray 14 comes incident into the detector 1. When the gamma ray 14 comes incident into the detector 1, carrier charges are generated in the detector 1 and a pulse current of an amount of the generated charges which is proportional to the energy of one photon of the gamma ray flows to be a detection signal. This detection signal is a high frequency pulse signal and passes through a capacitor 6 and reaches the amplification circuit 8.

Each of a capacitor 4 and a resistor 5 is connected between an input terminal and an output terminal of the amplification circuit 3 and in parallel with the amplification circuit 3. Since the amplification circuit 3 functions as a integration circuit with the capacitor 4, the pulse current is integrated and an amount of the charges is measured. The capacitor 4 becomes fully charged if pulse currents continue to come. In order to prevent the capacitor 4 from being fully charged, the resistor 5 is connected. Therefore a pulse of a voltage wave form, whose wave height corresponds to the amount of charges generated in the detector 1 and which attenuates according to a time constant determined by the capacitor 4 and the resistor 5, is outputted from the amplification circuit 3.

Next, the pulse voltage is inputted to both of the fast speed waveform shaping circuit 8 and the slow speed waveform shaping circuit 9. Since the fast speed waveform shaping circuit 8 a band-pass filter with a short time constant, fast current signal components from the detector 1, which correspond to current signal components which are in proportion to such quick change as electrons moving, are extracted from the band-pass filter and amplified. Therefore, when carriers of electrons are generated near the cathode, those electrons travel a longer way and pulses with large wave heights are outputted. When carriers of electrons are generated near the anode, those electrons travel a shorter way and pulses with small wave heights are outputted.

On the other hand, the slow speed waveform shaping circuit 9 is a band-pass filter having so long a time constant that integrates both a signal of electrons and a signal of holes sufficiently and a signal that is in proportion to all carrier charges generated from the detector 1 on the gamma ray 14 coming incident is outputted through this band-pass filter and amplified. Therefore the outputted pulse from the slow speed waveform shaping circuit 9 has a wave height value corresponding to the energy of the gamma ray 14. However if some holes are recombined with electrons and gone before coming over to the anode, the amount of the detected charges decreases, which results in lower energy detection accuracy, that is, lower energy resolution.

Since the generated holes has a small product of $\mu$ and $\tau$ due to an effect of the holes being recombined with electrons, the wave height value of the pulse signal outputted from the slow speed. waveform shaping circuit 9 lowers, which results in lowered accuracy for the detected gamma ray energy. This lowered accuracy for the detected gamma ray energy is attributed to the position in the thickness direction of the detector 1 at which the photoelectric effect of the gamma ray 14 occurs. If the photoelectric effect occurs near the anode, holes have to travel a long distance to the cathode and many of the holes are recombined with electrons. If the photoelectric effect occurs near the cathode, the recombination hardly occurs. Therefore if the position where the photoelectric effect occurs is known, correcting the wave height value is enabled. On the other hand, the fast speed waveform shaping circuit 8 outputs the pulse signal with a wave height value which is generated from the current signal almost exclusively of electrons, which is a result reflecting strongly the position in the thickness direction of the detector 1 at which the photoelectric effect occurs. Accordingly, if use is made of the wave height value of the pulse signal outputted from the fast speed waveform shaping circuit 8 to correct the wave height value of the pulse signal from the slow speed waveform shaping circuit 9, cancelling the effect of the holes being recombined is enabled. As a result, the effect of the hole being recombined is reduced and high energy resolution is to be obtained.

The wave height value out of the fast speed waveform shaping circuit 8 is converted to a corresponding digital value through the A/D converter 10 having a function to hold a peak value. The wave height value out of the slow speed waveform shaping circuit 9 is converted to a corresponding digital value through the A/D converter 11 having a function to hold a peak value. Both of these digital values are transmitted to the computing unit 12. The function to hold a peak is intended to be used to hold a wave height value of a pulse signal for a predetermined time and have it A/D converted. A predetermined computing operation is made the A/D converted data and the corresponding gamma ray energy is determined.

Figure 2A:
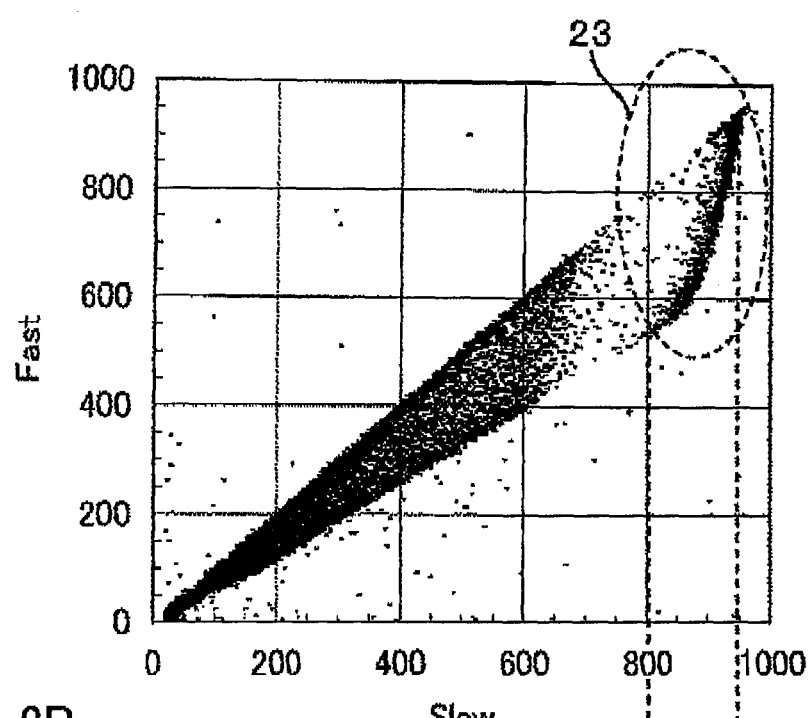
FIGS. 2A and 2B show results on measured gamma rays obtained without using the present invention, FIG. 2A being a figure with the horizontal axis (Slow) for the wave height value of a slow speed waveform shaping circuit and the vertical axis (Fast) for the wave height value of a fast speed waveform shaping circuit and FIG. 2B being a figure showing energy spectra obtained from the wave height value of the low speed waveform shaping circuit.

Next, several measured examples are to be explained. FIG. 2A shows a correlation plot between an output signal from the fast speed waveform shaping circuit 8 and an output signal from the slow speed waveform shaping circuit 9 when a gamma ray of 662 keV was radiated on a 2.3 mm thick detector 1 of CdTe to which a bias voltage of 800V is being applied. FIG. 2A is a plotted figure whose horizontal axis indicates the wave height value out of the slow speed waveform shaping circuit 8 (Slow) and whose vertical axis indicates the wave height value out of the fast speed waveform shaping circuit 9 (Fast). In this figure, values on the vertical axis are normalized in such a way that the maximum value on the vertical axis is equal to the maximum value on the horizontal axis.

Figure 2B:
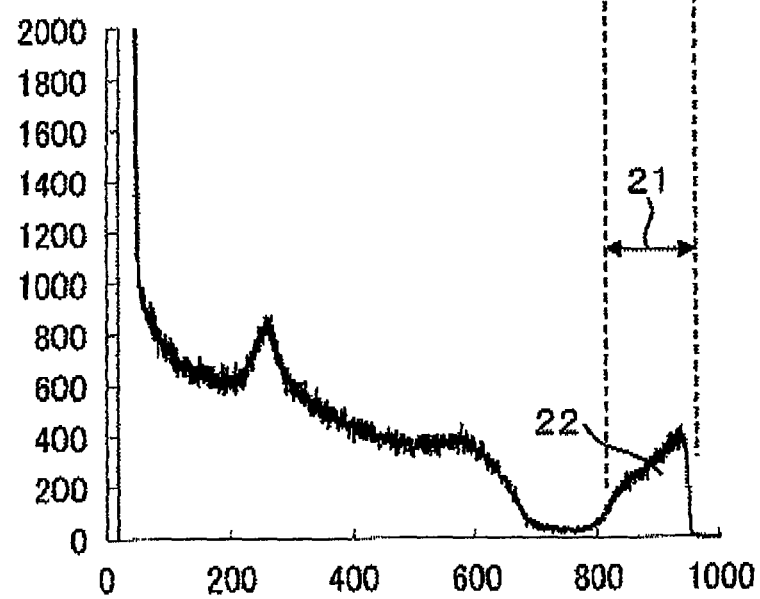

FIG. 2B shows an energy spectrum obtained from the wave height value of the slow speed waveform shaping circuit 9. The vertical axes and the horizontal axes of FIGS. 3A, 3B, FIGS. 5A, 5B and FIGS. 6A, 6B are identical to those of FIGS. 2A, 2B. A photo-peak 22 of 662 keV has a spread 21 in FIG. 2B. The energy resolution obtained from the 2.3 mm detector 1 of CdTe is about the same level as that from a scintillation detector, as understood with the spread 21. Since the large spread 21 indicates an energy resolution being not high, the spread 21 needs to be made as narrow as possible to improve the energy resolution.

In the measurement, a pair of wave height values, one out of the fast speed waveform shaping circuit 8 and the other out of the slow speed waveform shaping circuit 9, is obtained for one photon of a gamma ray. Each pair is plotted in FIG. 2A and FIG. 2B shows a histogram of the wave height values out of the slow speed waveform shaping circuit 8 for many incident photons of gamma rays. An equation of the present example is applied to the results of FIGS. 2A, 2B to make a correction on the results to compensate for an amount of the lost charges mainly due to the holes recombined with electrons. To be specific, a corrected wave height value Hs' is obtained as follows.

$$Hs'=Hs+0.26\times(Hs-Hf) \quad (1)$$

Figure 3A:
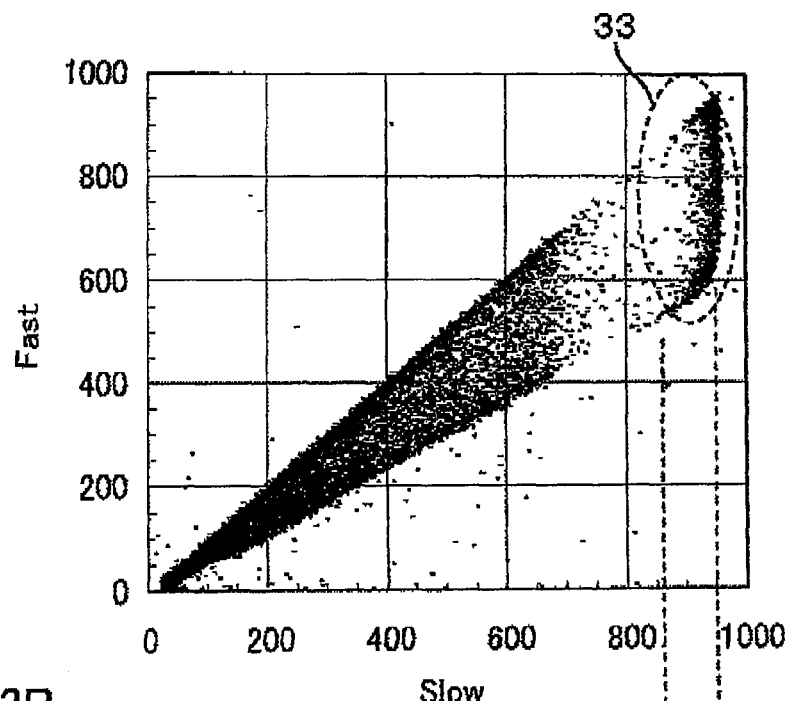
FIGS. 3A and 3B show results of a working example 1 on a measurement for a gamma ray of 662 keV, FIG. 3A being comparable to FIG. 2A and FIG. 3B being comparable to FIG. 2B.
Figure 3B:
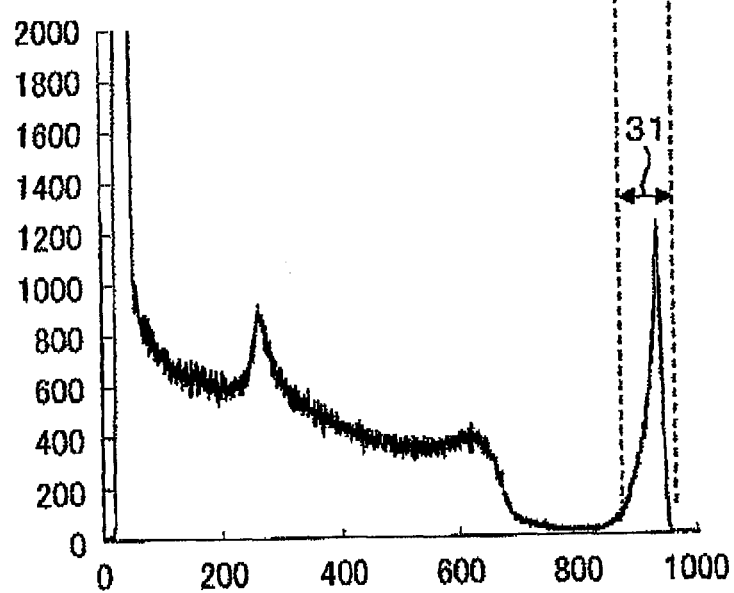
Figure 4A:
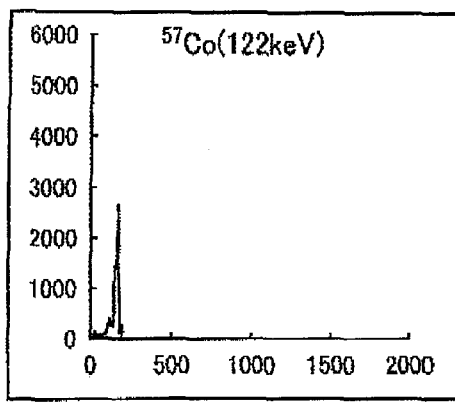
FIGS. 4A to 4F show results of the working example 1 on measurements for the gamma rays of 122 keV, 662 kev, 1173 keV and 1333 keV, FIGS. 4A and 4B representing results on $^{57}$Co before and after correction, FIGS. 4C and 4D representing results on $^{137}$Cs before and after correction and FIGS. 4E and 4F representing results on $^{60}$Co before and after correction.
Figure 4B:
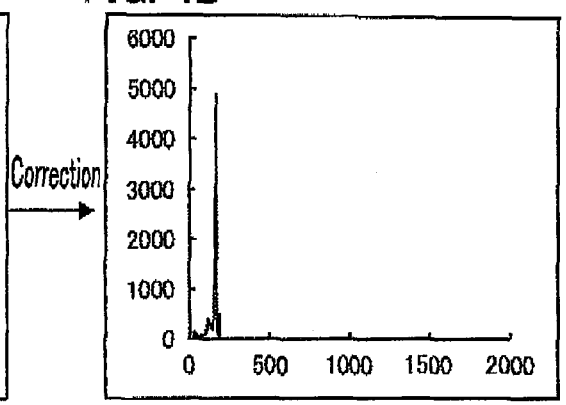
Figure 4C:
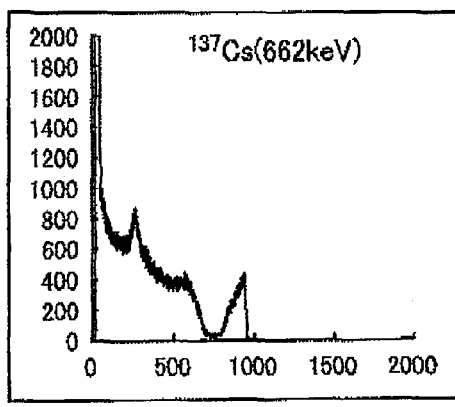
Figure 4D:
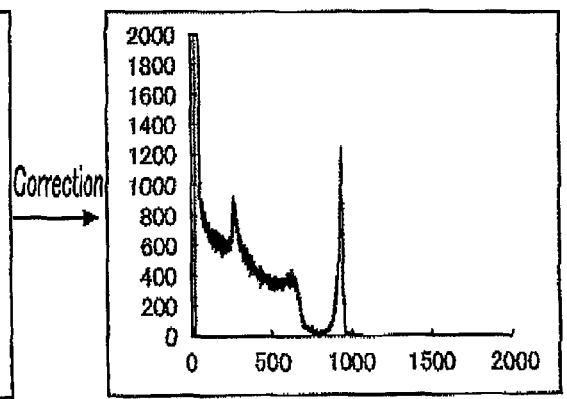
Figure 4E:
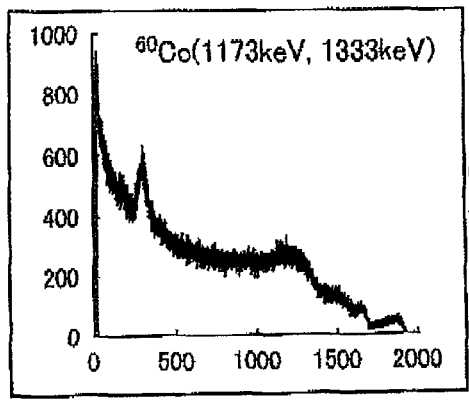
Figure 4F:
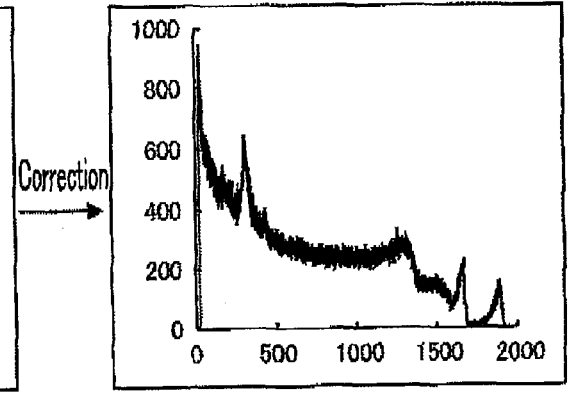

FIGS. 3A,3B are replotted results with the obtained Hs'.

In the correction equation (1), Hs denotes a measured wave height value out of the slow speed waveform shaping circuit 9 and Hf denotes a wave height value out of the fast speed waveform shaping circuit 8 normalized with respect to Hs. A coefficient of 0.26 in the correction equation (1) depends on the measurement condition and the measurement apparatus and ought to be optimized for the measurement system. The reason why the wave height value out of the fast speed waveform shaping circuit 8 is normalized is that output levels of different waveform shaping circuits having different waveform shaping time constants are different from each other and need to be equalized when correction is performed. The way to normalize the wave height value may be carried out in a different method. For example, both wave height values may be normalized by dividing the wave height value by a common reference value. A group 23 of photo-peaks for 662 keV in FIG. 2A becomes a group 33 in FIG. 3A which is narrower after correction is made, which means that energy variation decreases. Looking at the spectrum in FIG. 3B, it should be noted that the energy resolution for the photo-peak of 662 keV is extremely improved.

Instead of the correction equation (1), a method to make a correction using (Vf/Vs) is described in the non-patent document 2. In this method, Vf denotes a wave height value out of the fast speed waveform shaping circuit and Vs denotes a wave height value out of the slow speed waveform shaping circuit. Using this method, the similar effect to that of the correction equation (1) is obtained and not sufficient. The correction accuracy is not good when Vf and Vs are small. In this example (Hs−Hf) is used instead of (Vf/Vs). As a result a correction amount is relatively small with the difference being used and the correction accuracy is prevented from becoming worse.

FIG. 4 shows results for 122 keV on $^{57}$Co and 1173 keV and 1333 keV on $^{60}$Co in addition to 662 keV using the same correction equation, the same measurement apparatus and the same detector as used for the 662 kev result. As is shown in FIG. 4, the correction equation of the present example utilizes the difference and enables accurate correction over a wide energy range. As a result, good energy resolution is obtained over the wide energy range.

Although the present example makes use of CdTe for the detector 1, the detector material should not be limited to CdTe. Because there ought to be other compound semiconductor materials whose product of $\mu$ and $\tau$ of the hole is smaller than a product of $\mu$ and $\tau$ of the electron, the correction method of the present example is effectively applied to those compound semiconductor materials. In addition, the correction method has an outstanding effect on lowering the cost for and enhancing the performance of not only the radiation measurement apparatus but also the nuclear medicine diagnosis apparatus. Because a relatively thick detector element may be used, which leads to the cost reduction, and good energy resolution is obtained over the wide energy range unlike the conventional correction method despite using the relatively thick detector element. Moreover since a thicker CdTe element than the conventional method may be used for both the radiation measurement apparatus and the nuclear medicine diagnosis apparatus, the number of the detector elements is reduced significantly when a number of CdTe elements are used for, for example, the SPECT apparatus and the production cost for the SPECT apparatus is lowered.

Example 2

The correction equation (1) makes use of a difference of (Hs−Hf) in the wave height value between a couple of waveform shaping circuits whose time constants are different from each other. However, looking at the results on 662 keV in FIG. 3A, it is noted that the set of the plotted dots for 662 keV remains in a curved shape, which means that there is room for further correction. In order to make the set of the plotted dots in the curved shape as straight as possible, the inventors have found (Hs−Hf)Hs/Hf which is (Hs−Hf) multiplied with Hs and further divided by Hf, to be effective. Multiplying with Hs increases the correction amount when the number of the total charges inclusive of holes and electrons is large and dividing by Hf increases the correction amount when a contribution of the holes to the output signal is larger than that of the electrons.

There might be a risk that the correction accuracy deteriorates if Hs/Hf is used, as is the case with $V_{fast}/V_{slow}$ being used in the non-patent document 2. However since (Hs−Hf) is multiplied in this case, the risk is very small. After all, the following correction equation (2) is applied to the results in FIG. 2 and the corrected wave height values Hs' are obtained the same way as in Example 1.

$$Hs'=Hs+0.215\times(Hs-Hf)Hs/Hf \quad (2)$$

Figure 5A:
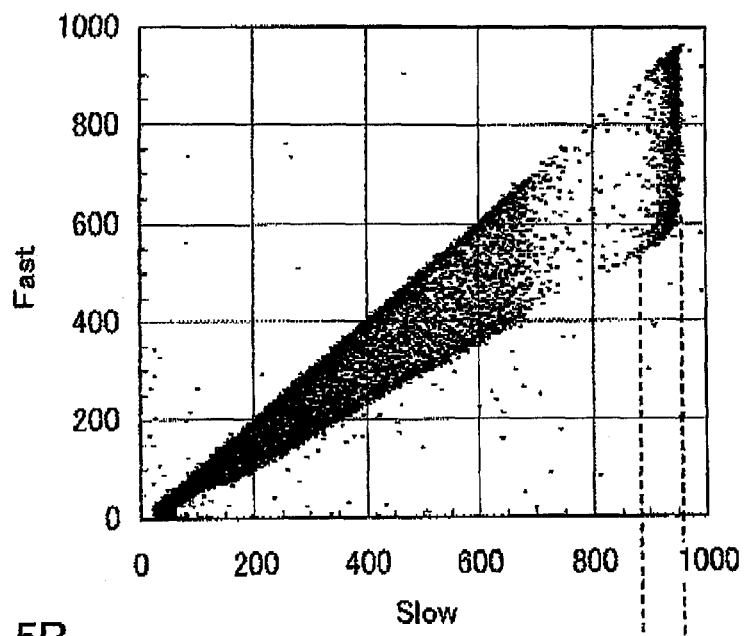
FIGS. 5A, 5B show results of a working example 2 on a measurement for the gamma ray of 662 keV, FIG. 5A being comparable to FIG. 2A and FIG. 5B being comparable to FIG. 2B.
Figure 5B:
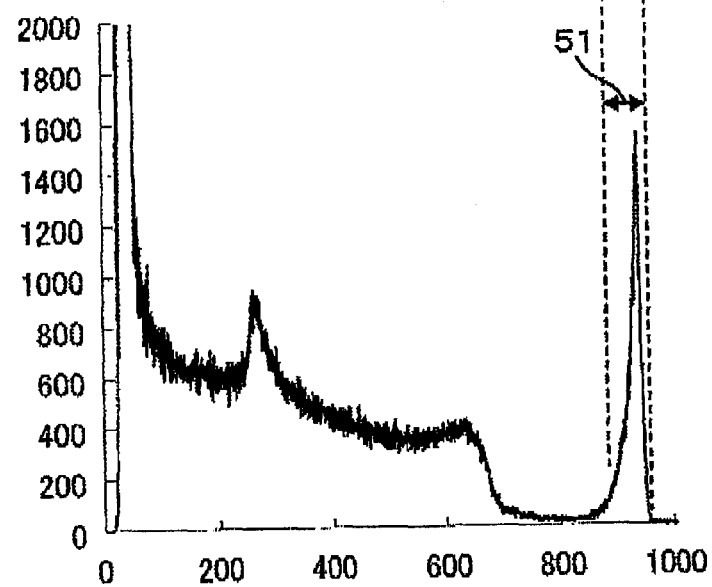

FIG. 5A shows results obtained after plotting Hf for the vertical axis against Hs' for the horizontal axis obtained according to the above correction equation (2). Since a spread 51 shown in FIG. 5B is narrower than the spread 31 in FIG. 3B showing the result of Example 1, higher energy resolution is obtained with this correction method. Although not shown in these figures, it should be noted that an effect of the energy resolution becoming higher over the wide energy range.

Example 3

Furthermore, in order to increase the correction amount from a difference between Hs and Hf, (Hs−Hf), when the contribution of the electron is smaller, which corresponds to the contribution of the hole being larger, good results are obtained by applying an exponential function to a difference between Hs and Hf, (Hs−Hf), divided by Hf, (Hs−Hf)/Hf. That is, the following correction equation (3) is applied to the results in FIG. 2 and the corrected wave height values Hs' are obtained the same way as in Example 1.

$$Hs'=Hs\times\exp(0.225\times(Hs-Hf)/Hf) \quad (3)$$

Figure 6A:
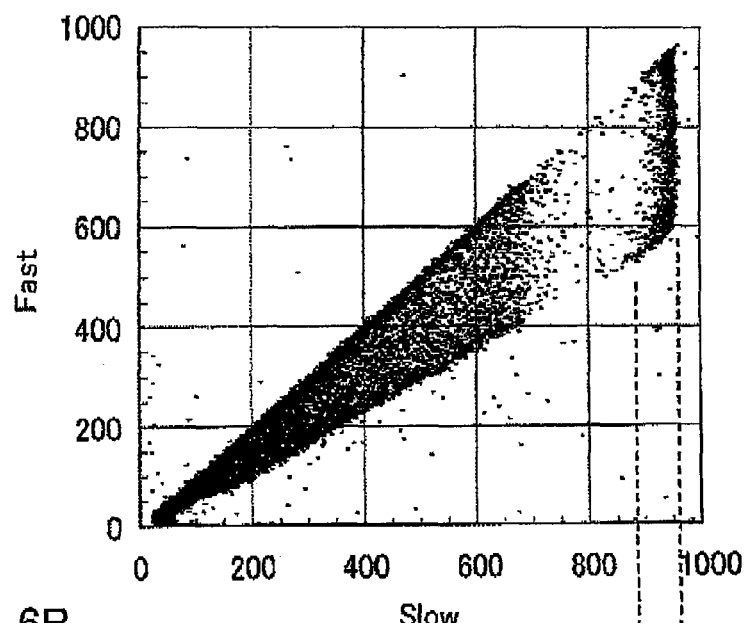
FIG. 6A, 6B show results of a working example 3 on a measurement for the gamma ray of 662 keV, FIG. 6A being comparable to FIG. 2A and FIG. 6B being comparable to FIG. 2B.
Figure 6B:
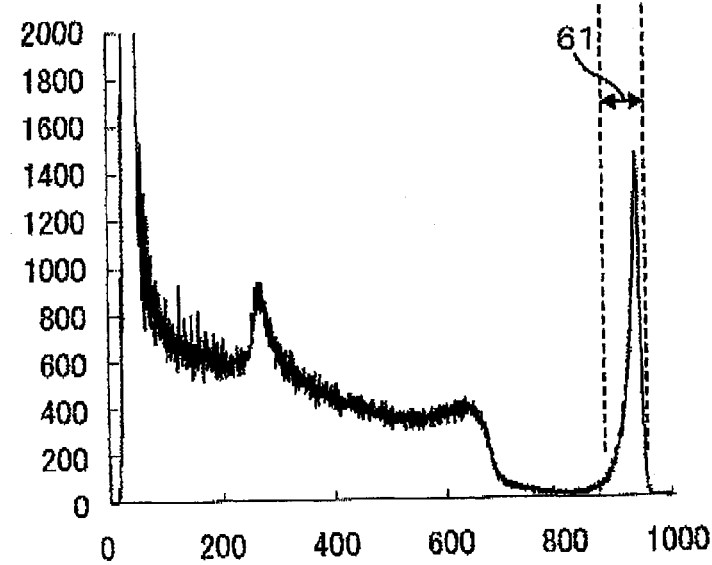

FIG. 6A shows results obtained after plotting Hf for the vertical axis against Hs' for the horizontal axis obtained according to the above correction equation. Since a spread 61 shown in FIG. 6B is narrower than the spread 31 in FIG. 3B showing the result of Example 1, higher energy resolution is obtained with this correction method, which is the case with Example 2. There seems to be almost no difference between this result and that of FIG. 5. As it is, the result of FIG. 6 is better than that of FIG. 5. The reason for this improvement is that a better correction can be made with use of an exponential function as movement of carriers in the semiconductor material is well expressed with an exponential function. Although not shown in these figures, it should be noted that an effect of the energy resolution becoming higher over the wide energy range, as is the case with Example 1 and Example 2.

Example 4

Figure 7:
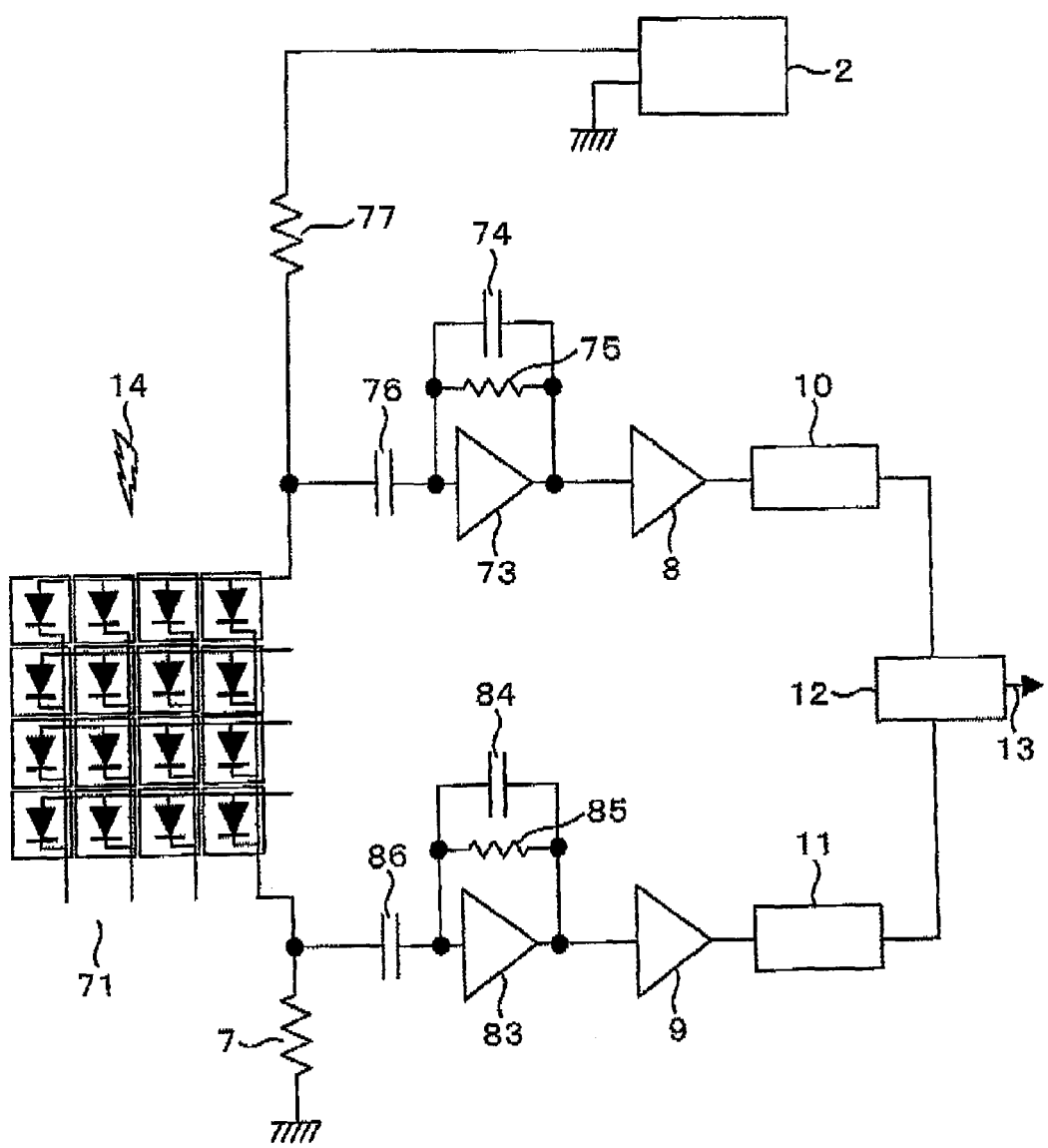
FIG. 7 shows schematically a circuit used for the radiation measurement apparatus of a working example 4.

The measurement circuit shown in FIGS. 1 to 3 includes a couple of waveform shaping circuits. The correction methods as above explained in Example 1 to 3 can be applied to a different measurement circuit from that in FIG. 1. FIG. 7 shows a measurement circuit for Example 4, in which a detector array 71 is used. Though this measurement circuit is the same as one disclosed in the non-patent document 1, the method explained in Example 1 to 3, which has a significant effect, is not disclosed.

The detector array 71 is intended to determine a position at which a gamma ray 70 comes incident as well. The detector array 71 consists of 16 detector pixels, with which 8 connection lines are connected. Circuits connected with 2 connection lines of the 8 connection lines are shown in FIG. 7. Amplification circuits 73, 83, capacitors 74, 84, resistors 75, 85 and capacitors 76, 86 have respectively the same function as the amplification circuit 3, the capacitor 4, the resistor 5 and the capacitor 6 in FIG. 1. In the measurement circuit in FIG. 7, a resistor 77 is connected to measure a signal from the high voltage side, only one circuit of the fast speed waveform shaping circuit 8 and the A/D converter 10 is connected with the amplification circuit 73 and only one circuit of the slow speed waveform shaping circuit 9 and the A/D converter 11 is connected with the amplification circuit 83.

Since there are 16 detector pixels constituting the detector array 71, 16 amplification circuits are needed and 32 waveform shaping circuits, which are double as many as the amplification circuits, are needed if a dedicated amplification circuit is connected with each of the detector pixels. However, making use of circuit connections shown in the present example, as little amplification circuits as 8 are needed and as little waveform shaping circuits inclusive of the fast ones and the slow ones are needed. The number of unit circuits is drastically decreased in the present example. The above explained correction methods can be applied to this measurement circuit and has an outstanding effect of reducing the cost for each of a gamma camera, a SPECT apparatus and a nuclear medicine diagnosis apparatus, all of which require a number of detector pixels.

INDUSTRIAL APPLICABILITY

Figure 8:
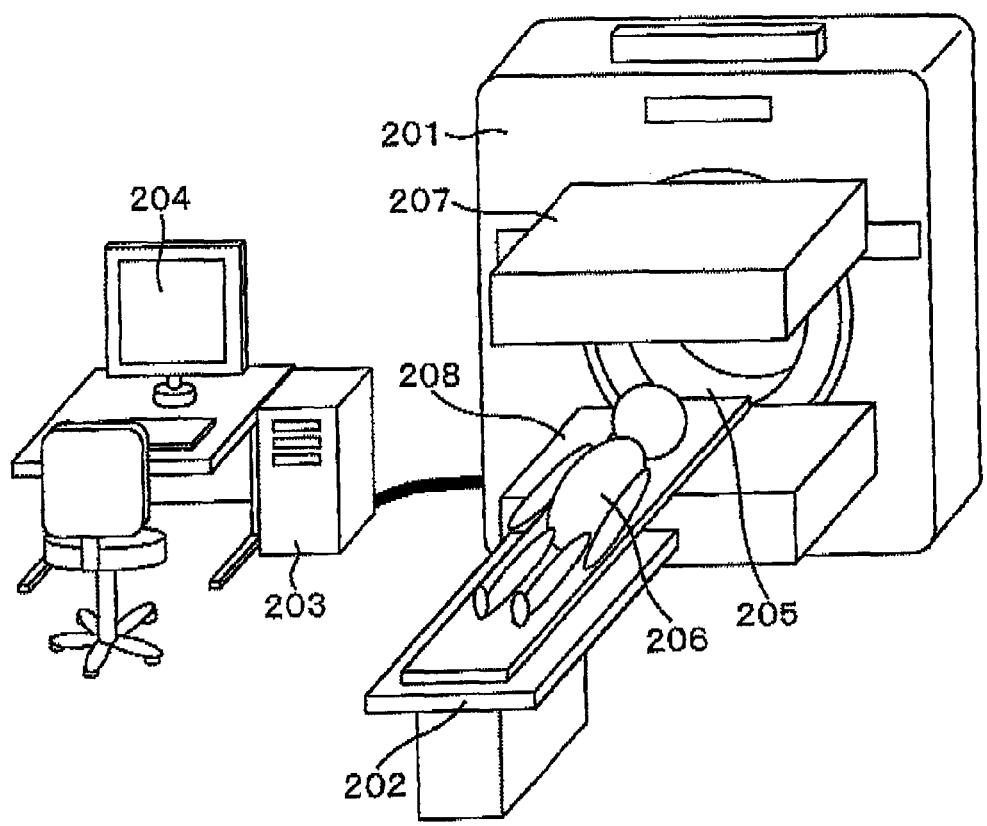
FIG. 8 is a perspective view showing schematically a SPECT apparatus in which the radiation measurement apparatus of a working example of the present invention is installed.

Using a semiconductor detector with high energy resolution capability has a significant effect on obtaining accurate energy information in the radiation measurement especially for the gamma ray. The present invention is intended to be applied to all radiation measurement apparatuses which use a semiconductor detector for which the product of $\mu$ and $\tau$ of the hole is smaller than the product of $\mu$ and $\tau$ of the electron. The present invention can be applied to the nuclear medicine diagnosis apparatus as well. FIG. 8 shows a single photon emission computed tomography apparatus (SPECT apparatus) in which a radiation measurement apparatus according to Example 1 of the present invention is installed. This SPECT apparatus includes a SPECT apparatus body 201, a detector plate 207 in which a collimator is attached, a bed 202 on which a measured object is placed, a data processing device 203 and a display 204.

While the measured object 206 laid on the bed 202 is disposed in a measurement space 205, radiation measurement is performed. Although the appearance of this SPECT apparatus is apparently the same as the conventional one, this SPECT apparatus is equipped with a detector having a higher energy resolution capability. As a result, this SPECT apparatus is highly capable of removing noise components generated by gamma rays being emitted from radioactive pharmaceuticals and scattered within a body of the measured object, which enables obtaining higher image quality. The present invention enables use of a relatively thick semiconductor detection element and enables producing the SPECT apparatus at a relatively low cost. In addition, this SPECT apparatus of the present invention has the equivalent performance to one with the thin semiconductor detector with the high energy resolution capability which is a feature of the semiconductor detector. As a result, the SPECT apparatus of the present invention is capable of creating higher quality image than the SPECT apparatus with a scintillator and inhibiting the cost increase for using a semiconductor detector which has a shortcoming of being expensive. The present inevention can be applied to the PET apparatus as well.

DESCRIPTION OF SIGNS

1 Detector
2 High Voltage Power Supply
3, 73, 83 Amplification Circuit
4, 6, 74, 76, 84, 86 Capacitor
5, 7, 75, 77, 85 Resistor
8 Fast Speed Waveform Shaping Circuit
9 Slow Speed Waveform Shaping Circuit
10, 11 A/D Converter
12 Computing Unit
13 Output Data
14 Gamma Ray
71 Detector Array
201 SPECT Apparatus Body
202 Bed
203 Data Processing Device
204 Display
205 Measurement Space
206 Measured Object
207, 208 Detector Plate

The invention claimed is:

1. A radiation measurement apparatus comprising:
a radiation detector of a semiconductor crystal for detecting gamma rays;
a power supply for applying a bias voltage to the radiation detector;
a pre-amplification circuit for amplifying a pulse signal from the radiation detector;
a couple of waveform shaping circuits having time constants different from each other, each of the couple of waveform shaping circuits configured to shape a waveform of an output signal from the pre-amplification circuit; and
a computing unit that obtains an energy value of the gamma rays by processing output signals from the couple of waveform shaping circuits using a difference between a couple of pulse height values of the output signals from the couple of waveform shaping circuits so as to correct pulse height values outputted from one of the couple of waveform shaping circuits,
wherein the computing processing uses the difference between the couple of pulse height values of the output signals from the couple of waveform shaping circuits and an inverse of the wave height value of one of the couple of waveform shaping circuits whose time constant is shorter than that of the other.

2. The radiation measurement apparatus as described in claim 1, which performs the computing processing to obtain a pulse wave height value denoted by H through an equation, $H=Hs+k\times(Hs-Hf)$, where Hs denotes a wave height value of one of the couple of waveform shaping circuits whose time constant is longer than that of the other of the couple of waveform shaping circuits, Hf denotes a wave height value of the other normalized with respect to Hs and k is a coefficient.

3. The radiation measurement apparatus as described in claim 2, wherein the semiconductor crystal is CdTe.

4. A nuclear medicine diagnosis apparatus in which the radiation measurement apparatus as described in claim 2 is installed.

5. The radiation measurement apparatus as described in claim 1, which performs the computing processing to obtain a pulse wave height value denoted by H through an equation, $H=Hs+k\times(Hs-Hf)\ Hs/Hf$, where Hs denotes a wave height value of one of the couple of waveform shaping circuits whose time constant is longer than that of the other of the couple of waveform shaping circuit, Hf denotes a wave height value of the other normalized with respect to Hs and k is a coefficient.

6. The radiation measurement apparatus as described in claim 5, wherein the semiconductor crystal is CdTe.

7. A nuclear medicine diagnosis apparatus in which the radiation measurement apparatus as described in claim 5 is installed.

8. The radiation measurement apparatus as described in claim 1, which performs the computing processing to obtain a pulse wave height value denoted by H through an equation, $H=Hs\times\exp(k(HS-Hf)/Hf)$, where Hs denotes a wave height value of one of the couple of waveform shaping circuits whose time constant is longer than that of the other of the couple of waveform shaping circuit, Hf denotes a wave height value of the other normalized with respect to Hs and k is a coefficient.

9. The radiation measurement apparatus as described in claim 8, wherein the semiconductor crystal is CdTe.

10. A nuclear medicine diagnosis apparatus in which the radiation measurement apparatus as described in claim 8 is installed.

11. The radiation measurement apparatus as described in claim 1, wherein the semiconductor crystal is CdTe.

12. A nuclear medicine diagnosis apparatus in which the radiation measurement apparatus as described in claim 1 is installed.

13. The radiation measurement apparatus as described in claim 1, wherein the semiconductor crystal is CdTe.

14. A nuclear medicine diagnosis apparatus in which the radiation measurement apparatus as described in claim 1 is installed.

15. The radiation measurement apparatus as described in claim 1, wherein the one of the couple of waveform shaping circuits which has corrected pulse height values has a longer time constant.

* * * * *